United States Patent [19]

Concannon

[11] 4,075,362

[45] Feb. 21, 1978

[54] METHOD FOR PROVIDING HEATED FUSER ROLL WITH IMPROVED RELEASE AND WEAR LIFE

[75] Inventor: Thomas P. Concannon, Newtown Square, Pa.

[73] Assignee: E. I. Du Pont de Nemours and Company, Wilmington, Del.

[21] Appl. No.: 714,270

[22] Filed: Aug. 13, 1976

Related U.S. Application Data

[63] Continuation-in-part of Ser. No. 508,667, Sept. 23, 1974, abandoned.

[51] Int. Cl.$^2$ ............................................. G03G 13/20
[52] U.S. Cl. ............................... 427/22; 106/287 SB; 252/58; 260/29.1 SB
[58] Field of Search .................... 427/22, 194; 252/58; 260/29.1, 29.1 SB; 106/287 R, 287 SB

[56] References Cited

U.S. PATENT DOCUMENTS

| | | | |
|---|---|---|---|
| 2,644,802 | 7/1953 | Lontz | 260/29.1 |
| 2,946,763 | 7/1960 | Bro et al. | 260/45.5 |
| 3,011,975 | 12/1961 | Nitzsche et al. | 252/58 X |
| 3,159,577 | 12/1964 | Ambrose et al. | 252/58 X |
| 3,314,889 | 4/1967 | Christian | 252/58 X |
| 3,453,210 | 7/1969 | Wright | 252/28 |
| 3,505,229 | 4/1970 | Skehan | 252/58 X |
| 3,810,776 | 5/1974 | Banks et al. | 427/194 |
| 3,934,547 | 1/1976 | Jelfo et al. | 118/60 |
| 3,975,352 | 8/1976 | Yoerger et al. | 260/29.1 SB |

OTHER PUBLICATIONS

Research Disclosures; Product Licensing Index; July, 1972, pp. 72–73.

*Primary Examiner*—Harry J. Gwinnell
*Assistant Examiner*—Stuart D. Frenkel

[57] ABSTRACT

A coating composition, useful for preventing offset of toner to a heated fuser roll, comprises a dispersion of
(A) a perfluoroolefin polymer of a fluorosurfactant; and
(B) a carrier such as silicone oil:

said composition, when continuously applied to the uncoated metal fuser roll, increases the wear life of that roll to the wear life of the metallic surface of the roll and considerably extends the release life.

13 Claims, No Drawings

METHOD FOR PROVIDING HEATED FUSER ROLL WITH IMPROVED RELEASE AND WEAR LIFE

CROSS-REFERENCE TO RELATED APPLICATION

This is a continuation-in-part of application Ser. No. 508,667, filed Sept. 23, 1974, now abandoned.

BACKGROUND OF THE INVENTION

Contact fusing of thermoplastic powder xerographic images is typically carried out by the use of a heated roll that conducts heat through its outer surface or sheath to a thermoplastic image held in contact therewith by a back-up pressure roll. The heated image particles soften, flow, and are thereby fixed onto the sheet upon which they are supported. Insufficient heating leaves the toner particles in a partially powder form so that they can separate with part of the ink particles going to the heated roll and part of the particles remaining on the support sheet. On the other hand, excessive heating of the toner produces a liquid having low cohesive strength allowing separation with the result again being the transfer of some toner to the heated fuser roll. In both cases the ultimate result is that some of the toner deposited on the fuser roll may be re-deposited on the subsequent image sheet creating unsightly smudged images. The tendency for offset may be reduced by minimizing the adhesive nature of the heated fuser roll.

Employing fuser rolls having surfaces of a material such as polytetrafluoroethylene, which is known to have low surface energy, either alone or in combination with lubricant liquids such as silicone oil, provides such a non-adhesive surface. While such materials do provide a relatively non-adhesive surface they create certain limitations on the overall performance of the contact fuser. For example, the operative or wear life of a fuser roll having such a pre-applied permanent offset preventing release surface layer will be limited by the life of that layer necessitating frequent servicing. Furthermore, imperfections created in the surface layer by constant use diminish its release life and limit the speed of operation.

This invention provides an adhesion preventing layer that can be continuously applied to the bare metal surface of the fuser roll thereby increasing its wear life to that of the metallic surface and also considerably increasing the release life. Additionally, since a new non-adhesive layer is being deposited during each xerographic reproduction process, increased speeds of operation can be achieved.

SUMMARY OF THE INVENTION

A composition, useful for providing heated fuser rolls coated with an adhesion preventing layer, is applied continuously to the bare metal surface of the fuser rolls by conventional means and consists essentially of a dispersion of (A) 5 to 30% by weight, based on the weight of (A) and (B), of a perfluoropolymer or fluorosurfactant, dispersed in (B) 95 to 70% by weight, based on the weight of (A) and (B), of an offset preventing lubricating liquid, such as silicone oil, said silicone oil having a viscosity of from 0.5 to 100,000 centistokes at 25° C, surface tension of 16 to 30 dynes/centimeter, and vapor pressure not exceeding 200 mmHg at 205° C; and optionally, pigments, colorants, stabilizers, and adhesion promoters; wherein said dispersion resists settling and has a viscosity of from 0.5 to 100,000 centistokes at 25° C and a surface tension of from 19 to 33 dynes/centimeter.

DESCRIPTION OF THE INVENTION

The offset preventing composition of this invention is a dispersion of a perfluoroolefin polymer of a fluorosurfactant and a material acting as a carrier for the aforesaid perfluoroolefin polymer or fluorosurfactant.

This dispersion has the following physical characteristics: surface tension, 19–33 dynes/centimeter; viscosity, 0.5–100,000 centistokes at 25° C; and is nonsettling or re-dispersible if settled, and it provides an adhesion preventing layer between the fuser roll and the toner.

It is to be understood that while the composition of this invention is considered to have general application it is particularly useful in xerography and, therefore, for convenience of illustration, the invention is described with reference to such use.

The fluoroolefin polymers employed in the offset preventing composition contain from about 5 to 100% by weight of tetrafluoroethylene (TFE) and the corresponding 95 to 0% by weight of hexafluoropropylene (HFP) and preferably 50 to 100% of TFE and 50 to 0% HFP. The most preferred perfluoroolefin polymers are as follows: A low melt fluorinated ethylene propylene (FEP) containing approximately 75 to 80% by weight of tetrafluoroethylene and approximately 20 to 25% by weight of hexafluoropropylene; a regular melt FEP containing approximately 84 to 88%, but most preferably 85% by weight of TFE and 16 to 12%, but most preferably 15% by weight of HEP; a perfluoroolefin polymer containing approximately 93 to 95% by weight TFE and 7–5% by weight HEP; polytetrafluoroethylene processed from its aqueous dispersions by any of the conventional methods, for example, liquid nitrogen processing, or post-treated, for example, by electonbeam irradiation employing a 10 megarad dosage; Vydax ®, a Fluorocarbon Telomer of tetrafluoroethylene of approximately 25,000 molecular weight. (Vydax is a registered trademark of E. I. du Pont de Nemours and Company). The perfluoroolefin polymers are well known in the art and can be prepared for example by the method of Bro, U.S. Pat. No. 2,946,763 issued July 26, 1960.

The fluorocarbon surfactants are mixtures of mono- and di- esters of phosphoric acid prepared with alcohols of the generalized formula $F(CF_2CF_2)_nCH_2CH_2OH$, where $n$ can range from 3 to 8.

Mixtures of perfluoroolefin polymers or fluorosurfactants or mixtures of the polymers with the surfactants can be employed.

The carrier liquid utilized in the adhesion preventing composition can be a silicone oil. The organopolysiloxanes or silicone oils are well known in the art and are represented by the formula

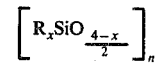

where $x$ can be 1, 2 or 3, R represents a monovalent hydrocarbon radical or a substituted monovalent hydrocarbon radical and $n$ varies with the viscosity. The hydrocarbon radical R can be methyl, octadecyl, phenyl, benzyl, allyl, etc. The silicone oils have a viscosity range of 0.5 - 100,000 centistokes at 25° C, and preferably 10 - 10,000 1 centistokes surface tension of about 16-30 dynes/centimeter, and a vapor pressure not exceeding 200 mmHg at 205° C. A preferred silicone oil used in this invention is dimethyl polysiloxane, known in commerce as Dow-Corning ® 200 fluid, having a viscosity range of 0.65 to 2,500,000 centistokes at 25° C. Mixtures of different silicone oils can be utilized.

The following are some preferred offset preventing compositions:

(A) 8 to 30% by weight of a fluorinated ethylene propylene wherein the TFE/HFP weight ratio is about 75/25 (known as low melt fluorinated ethylene-propylene, LM-FEP), and 92 to 70% by weight of a dimethyl polysiloxane having a viscosity range of 50 to 1,000 centistokes at 25° C.

(B) 8 to 30% by weight of a polytetrafluoroethylene and 92 to 70% by weight of a dimethyl polysiloxane having a viscosity range of 50 to 1,000 centistokes at 25° C.

(C) 8 to 30% by weight of a fluorinated ethylene propylene wherein the TFE/HFP weight ratio is about 85/15 (known as regular melt fluorinated ethylene-propylene, RM-FEP), and 92 to 70% by weight of a dimethyl polysiloxane having a viscosity range of 50 to 1,000 centistokes at 25° C.

Each of the aforementioned dispersions provides an excellent offset preventing layer on fuser rolls in xerographic applications and also can be utilized in a variety of other applications, such as coating of cooking surfaces or where a continuously applied release coating or lubrication is needed.

The offset preventing composition of this invention can be applied to a variety of non-porous substrates such as metals, for example steel or aluminum. The ratio of fluorocarbon materials to the carried can depend on the post-treatment of the substrate. Certain materials on the surface of the substrate, or when mixed with the offset preventing composition, can effect a reduction in the relative quantity of the fluorocarbon material necessary to prevent offset of toner. As little as 0.7 part by weight, based on the weight of the dispersion, can be effective in presence of such additional materials such as zinc phosphate, iron phosphate or a chromium oxide.

The offset preventive composition of this invention must contain at least 5% by weight, based on the weight of the dispersion, of the fluorocarbon materials to provide an adhesion preventing layer on the heated fuser rolls. Preferably the dispersion contains at least about 10% and more preferably 18 to 22% by weight of such fluorocarbon material to afford an optimum relationship between operating speed, thickness of the offset preventing layer, and quantity of the fluorocarbon materials deposited. The dispersion can contain up to about 30% by weight, based on the weight of the dispersion, of said fluorocarbon material. At such levels, the dispersions resist settling or, if settled, are readily re-dispersible.

The upper level limitation of the quantity of fluorocarbon material to be utilized in the composition of this invention has been found to be important.

When an attempt was made to prepare an offset preventing composition containing 50% by weight of a fluorocarbon material, above the range contemplated by the present invention, a dispersion could not be obtained. Upon mixing, for several minutes, equal weight quantities of an LM-FEP with a silicone oil (dimethyl polysiloxane, DC-200, available from Dow-Corning), a crumbly paste, something akin to a cake mix partially wet with milk, resulted.

However, further addition to this paste of the above silicone oil, viscosity at 25° C. of 50 centistokes, in sufficient quantity to bring the composition to 20/80 (by weight) of LM-FEP/silicone oil, within the limits of the present invention, resulted in a thin liquid dispersion. This dispersion can now be applied to a fuser roll surface in a practical manner to function as an offset preventing composition.

The components of the adhesion preventing dispersions of this invention are mixed in a conventional manner, for example, in a ball or pebble mill to obtain the desired dispersion.

The dispersions of this invention to be employed as offset preventing release coatings are selected with reference to the operating conditions of the copying apparatus. Particular attention is paid to the operating temperature of the heated roll to which the offset preventing layers are applied. While the currently popular toners are based on resins which are fused in the range of 175° to 220° C it is conceivable that toners fusing closer to room temperature could be utilized. The particular components of the dispersions of this invention are selected for their properties at the operating temperature.

The main criteria for material selection are heat stability of the fluorocarbon materials and the carriers and the vapor pressure of these carriers at the operating temperature. Heat stability can be measured by weight loss of the components of the dispersion. The weight loss should not exceed approximately 0.5% by weight in 1 minute at 205° C and the maximum vapor pressure should not exceed 200 mmHg at 205° C.

Methods of application of the offset preventing layer of this invention to the heated contact surface of the fuser roll are known in the art. One method in use is described by Van Dorn in U.S. Pat. No. 3,268,351 issued Aug. 23, 1966 and comprises an applicator roll picking up oil from a saturated felt pad positioned in an oil reservoir, thinning to the desired thickness by a doctor blade, and depositing on the fuser roll. Oil is fed to the reservoir through a suitable commercial constant level device and is thereby able to maintain the saturation of the felt pad. However, in the past, the prior art methods generally utilized the continuous application of only a secondary release agent or agents to a pre-coated fuser roll, as in the above mentioned Van Dorn patent. The present invention provides for the continuous application of the novel offset preventing dispersion to the uncoated heated fuser rolls by the methods described in the prior art. The dispensing methods currently in use need no modification to be applicable with this invention as long as the compositions are in a dispersion form, as provided by this invention.

The method of repeatedly applying an offset preventing coating to the uncoated fuser rolls used in xerographic copying extends the wear life of such fuser rolls to the wear life of the outer sheath of the fuser rolls by providing a thin layer of the non-adhesive dispersion for the heated surface of the rolls as such surface comes in contact with a supporting sheet carrying the toner. Such repeated application deposits a new release surface increasing the release life essentially indefinitely. Furthermore, having such a newly deposited offset preventive layer, instead of a permanent coating generally employed in the prior art, a faster rate of operation is permitted. This is the case because the wear marks, that appear faster on the permanent coatings at the higher operating speeds than at lower speeds, are largely eliminated by the new method.

The adhesion preventing dispersion of this invention is applied to the fuser rolls in thin layers. The approximate coating weight is 0.05 mg/cm$^2$ corresponding to an approximate thickness, assuming arbitrarily a 1.25 g/cm$^3$ density for the dispersion, of 0.0004 mm. It is thought that the fluorocarbon materials, which act as the adhesion preventing component of the adhesion preventing composition of this invention, do not form a continuous film. These layers are much thinner than the permanent coatings utilized on the prior art fuser rolls. The release layer of this invention does not impair the life of the rolls to which it is applied; on the contrary, it extends the service life of the rolls to that of the metal surface. Previously, the service life was limited by the useful life of the permanent coatings generally described by the prior art, e.g. polytetrafluoroethylene as in Aser, U.S. Pat. No. 3,291,466 issued Dec. 12, 1966. With the continuously applied release layer of this invention it becomes possible to select the roll material for its longevity and heat transfer properties without compromise due to questions, for example, of adherence of the pre-applied permanent coating to the metal surface of the fuser roll.

Ink release and offset preventing properties of coated and un-coated surfaces can be tested by a variety of methods, as for example: heat a hot plate to approximately 150° C, place a model panel on the hot plate and adjust the surface temperature to approximately 150° C. Remove the model panel from the hot plate. Place four drops of the composition to be tested on a clean surface of sample panel and spread uniformly using a paper wipe. Remove the excess coating composition with a second paper wipe. Place sample panel on the hot plate. When surface temperature reaches 150° C dip a brush into the toner and transfer a small amount of toner to the heated sample surface by gently tapping the brush while it is held over the surface. After 1 minute place a paper strip over the toner and roll twice with a rubber roller. Remove the paper strip and examine the underlying surface. Complete removal of the toner from the surface constitutes passing and incomplete removal of toner from surface constitutes failure. This procedure can be repeated at temperatures of 177°, 205° and 218° C, respectively. Results are reported as either pass or fail at each of the temperatures.

The following examples, where all percentages are by weight, illustrate the invention:

EXAMPLES 1 – 14

The appropriate amounts of a silicone oil and a fluorocarbon material are mixed and agitated for a period of approximately 15 minutes. The resultant dispersion is applied to the cold rolled stainless steel or aluminum substrate to provide a thin film of approximately 0.05 mg/cm$^2$ coating weight. The coated substrate is heated on a hot plate until the surface temperature reaches approximately 150° C. Testing of the compositions is carried out as described above; the cooking compositions are the test results on offset preventing properties are detailed in the Table below; Examples 3 and 5, showing compositions containing less than 5% by weight of the fluorocarbon material, are outside the scope of this invention.

| | Coating Composition | | | |
|---|---|---|---|---|
| Ex. | Fluorocarbon Material (parts) | Silicone Oil(parts) | Substrate | Offset Preventing Property |
| 1 | RM-FEP(30) | DC-200(70),50cs | Steel | pass |
| 2 | RM-FEP(10) | DC-200(90),50cs | Steel | pass |
| 3 | RM-FEP (3) | DC-200(97),50cs | Steel | fail |
| 4 | RM-FEP(30) | DC-200(70),350cs | Steel | pass |
| 5 | RM-FEP (3) | DC-200(97),350cs | Steel | fail |
| 6 | RM-FEP(30) | DC-200(70),50cs | Aluminum | pass |
| 7 | RM-FEP(30) | DC-200(70),350cs | Aluminum | pass |
| 8 | FM-FEP(10) | DC-200(90),50cs | Aluminum | pass |
| 9 | LM-FEP(10) | DC-200(90),350cs | Steel | pass |
| 10 | Vydax ®(10) | DC-200(90),350cs | Steel | pass |
| 11 | PTFE (10) | DC-200(90),350cs | Steel | pass |
| 12 | FS (10) | DC-200(90),350cs | Steel | pass |
| 13 | RM-FEP(30) | DC-200(70),1000cs | Steel | pass |
| 14 | RM-FEP (5) | DC-200(95),50cs | Steel | pass |

RM-FEP: regular melt fluorinated ethylene propylene, approximate TFE/HFP ratio 85/15.
LM-FEP: low melt fluorinated ethylene propylene, approximate TFE/HFP ratio 75/25.
PTFE: ® polytetrafluoroethylene.
Vydax: Fluorocarbon Telomer of TFE, approximate molecular weight of 25,000.
FS: Fluorosurfactant.
DC-200: dimethyl polysiloxane of indicated viscosity (centistokes, at 25° C).

What is claimed is:

1. In a xerographic printing process, wherein the image particles are fused onto a supporting sheet by passing said sheet between a pressure roll and a heated fuser roll, the image particles come into contact with the metal surface of said fuser roll; the improvement consisting essentially of continuously applying to said surface a layer of an offset preventing composition consisting essentially of
   (A) 5 to 30% by weight, based on the weight of (A) plus (B), of I, II or a mixture of I and II; wherein
      (I) is a perfluoroolefin polymer containing 5 to 100% by weight, based on the perfluoroolefin polymer, of tetrafluoroethylene and 95 to 0% by weight, based on the perfluoroolefin polymer, of hexafluoropropylene and
      (II) is a fluorosurfactant, wherein said fluorosurfactant is a mixture of mono- and di- esters of phosphoric acid prepared with an alcohol of formula F(CF$_2$CF$_2$)$_n$CH$_2$CH$_2$OH, where $n$ is from 3 to 8;
   admixed with
   (B) 95 to 70% by weight based on the weight of (A) plus (B) of a silicone oil dispersing agent, wherein said dispersing agent has surface tension of 16 to 30 dynes/centimeter, viscosity range of 0.5 to 100,000 centistokes at 25° C, and a maximum vapor pressure of 200 mmHg at 205° C.

2. The process of claim 1 wherein the perfluoroolefin polymer is polytetrafluoroethylene.

3. The process of claim 1 wherein the perfluoroolefin polymer is a fluorinated ethylene propylene; wherein said polymer contains 75 to 80% by weight, based on the polymer, of tetrafluoroethylene and 25 to 20% by weight, based on the polymer, of hexafluoropropylene.

4. The process of claim 1 wherein the perfluoroolefin polymer is a fluorinated ethylene propylene: wherein said polymer contains 84 to 88% by weight, based on the polymer, of tetrafluoroethylene and 16 to 12% by weight, based on the polymer, of hexafluoropropylene.

5. The process of claim 1 wherein the perfluoroolefin polymer is a fluorinated ethylene propylene; wherein said polymer contains 93 to 95% by weight, based on the polymer, of tetrafluoroethylene and 7 to 5% by weight, based on the polymer, of hexafluoropropylene.

6. The process of claim 1 wherein the dispersing agent is an organopolysiloxane of the general formula

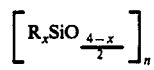

wherein x is 1, 2 or 3, R is a monovalent hydrocarbon radical, and n is an integer which varies with the viscosity.

7. The process of claim 6 wherein R is methyl, x is 2, and n is such that the viscosity range is between 0.5 and 100,000 centistokes at 25° C.

8. In a xerographic printing process, wherein the image particles are fused onto a supporting sheet by passing said sheet between a pressure roll and a heated fuser roll, the image particles come into contact with the metal surface of said fuser roll; the improvement consisting essentially of continuously applying to said surface a layer of an offset preventing composition consisting essentially of
  (A) 5 to 30% by weight, based on the weight of (A) plus (B), of I, II or a mixture of I and II: wherein
    (I) is a perfluoroolefin polymer containing 5 to 100% by weight, based on the perfluoroolefin polymer, of tetrafluoroethylene and 95 to 0% by weight, based on the perfluoroolefin polymer, of hexafluoropropylene and
    (II) is a fluorosurfactant, wherein said fluorosurfactant is a mixture of mono- and di- esters of phosphoric acid prepared with an alcohol of formula $F(CF_2CF_2)_nCH_2CH_2OH$, where n is from 3 to 8;
  admixed with
  (B) 95 to 70% by weight, based on the weight of (A) plus (B), of an organopolysiloxane of the general formula

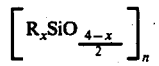

wherein x is 1, 2 or 3, R is a monovalent hydrocarbon radical, and n is such so as to provide a viscosity range of 10–10,000 centistokes at 25° C.

9. In a xerograpic printing process, wherein the image particles are fused onto a supporting sheet by passing said sheet between a pressure roll and a heated fuser roll, the image particles come into contact with the metal surface of said fuser roll; the improvement consisting essentially of continuously applying to said surface a layer of an offset preventing composition consisting essentially of
  (A) 5 - 30% by weight, based on the weight of (A) plus (B), of a perfluoroolefin polymer containing 5 to 100% by weight, based on the perfluoroolefin polymer, of tetrafluoroethylene and 95 to 0% by weight, based on the perfluoroolefin polymer, of hexafluoropropylene and
  (B) 95 to 70% by weight, based on the weight of (A) plus (B), of an organopolysiloxane of the general formula

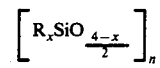

wherein x is 1, 2 or 3, R is a monovalent hydrocarbon radical, and n is such so as to provide a viscosity range of 10–10,000 centistokes at 25° C.

10. In a xerographic printing process, wherein the image particles are fused onto a supporting sheet by passing said sheet between a pressure roll and a heated fuser roll, the image particles come into contact with the metal surface of said fuser roll; the improvement consisting essentially of continuously applying to said surface a layer of an offset preventing composition consisting essentially of
  (A) 10 to 30% by weight, based on the weight of (A) plus (B), of a perfluoroolefin polymer containing 75–80% by weight, based on the polymer, of tetrafluoroethylene and 25–20% by weight, based on the polymer, of hexafluoropropylene; and
  (B) 90 to 70% by weight, based on the weight of (A) plus (B), of a dimethyl siloxane polymer having a viscosity of 0.5 to 100,000 centistokes at 25° C.

11. The process of claim 2 wherein the dispersing agent is a dimethyl siloxane polymer having a viscosity of 0.5 to 100,000 centistokes at 25° C.

12. The process of claim 4 wherein the dispersing agent is a dimethylsiloxane polymer having a viscosity of 0.5 to 100,000 centistokes at 25° C.

13. The process of claim 10 wherein said composition contains 18 to 22% by weight, based on the weight of the composition, of said perfluoroolefin polymer and 82 to 78% by weight, based on the weight of the composition, of a dimethylsiloxane polymer having a viscosity of 50 to 1,000 centistokes at 25° C.

* * * * *